Sept. 26, 1944.   M. LIWSCHITZ   2,359,133
ELECTROMAGNETIC COUPLING
Filed Aug. 22, 1941

WITNESSES:

INVENTOR
Michael Liwschitz.
BY
ATTORNEY

Patented Sept. 26, 1944

2,359,133

UNITED STATES PATENT OFFICE 2,359,133

ELECTROMAGNETIC COUPLING

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,943

3 Claims. (Cl. 172—284)

My invention relates to an electromagnetic coupling particularly one in which speed regulation is desired, that is, wherein it is desired to change the transmission ratio between the driving and driven member of the coupling. Such type of coupling is of general application and is particularly useful in ship propulsion drives.

An object of my invention is to provide an electromagnetic coupling having a driving member and a driven member, one of which is energized by a salient pole direct current energized winding and the other of which has a special type of winding, similar to a squirrel cage winding, which is so wound as to give an effect of a substantial increase in secondary resistance when the pole number is reduced.

Other objects and advantages will become more apparent from a study of the following specification when considered in conjunction with the accompanying drawing, in which.

Speed regulation of an electromagnetic coupling whose field is energized by direct current and whose secondary member is arranged similar to the rotor of a squirrel-cage induction motor can be obtained by varying the intensity of the direct current. This method of regulating the speed of the coupling corresponds to that of controlling the speed of an ordinary induction motor by varying the voltage applied to its primary winding. It is well known that when the secondary member of the machine is equipped with an ordinary squirrel-cage winding or with a solid core, a speed range of great width can be obtained only by making the secondary resistance sufficiently high, and this means, of course, that in this case the machine will have a full-load slip higher than normal, but a higher full-load slip entails increased losses, so that it may become necessary to increase the physical size of the machine in order to prevent a drop in its nominal rating.

Figure 4:
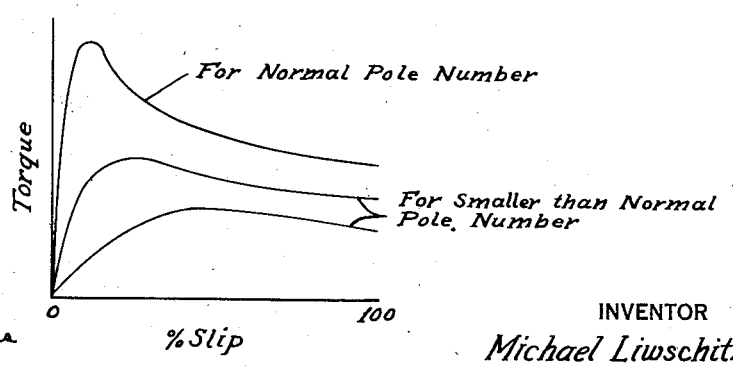
Fig. 4 shows the Torque-Percentage Slip characteristics of an electromagnetic coupling for different pole numbers.

I propose to avoid the disadvantage just mentioned by making provisions not only for controlling the energizing current, but also for changing the pole number of the field system. This changing of the pole number corresponds to the changing of the primary frequency in the case of an ordinary induction motor. It has the same effect which an artificial increase of the squirrel-cage resistance would have, i. e. it increases the slip at the pull-out point, as shown in Fig. 4.

Figure 1:
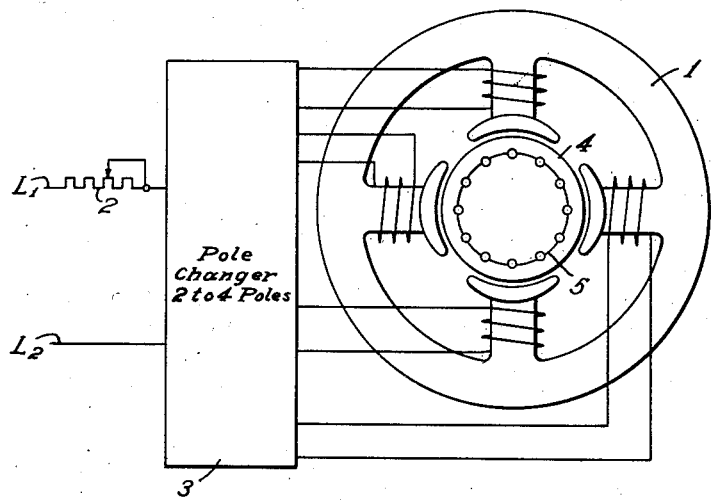
Figure 1 is a schematic showing of an electromagnetic coupling embodying the principles of my invention.

Referring more particularly to Fig. 1, numeral 1 denotes a driving member of the electromagnetic coupling having a plurality of salient poles which are energized by direct current supplied by the direct current source L1 and L2 which is supplied through a suitable variable resistor which is for the purpose of varying the excitation of the direct current winding. A suitable pole changing switch shown schematically by numeral 3 is provided for changing the number of poles from 2 to 4 or from any larger number to twice that number. The details of such switch are not shown since it comprises matter well known in the art and forming in of itself no part of my invention. While I prefer to change the number of poles by a ratio of 2 to 1 it is apparent that other ratios may be suitable. For normal operation the coupling would be preferably connected for the higher pole member. Electromagnetically coupled with the driving member 1 is a driven member 4 having a special type of squirrel-cage winding 5, which winding is shown in Figs. 2 and 3, and which show alternate forms of such squirrel-cage type of winding.

In a coupling in which the pole number can be changed, an additional increase in cage-resistance is obtainable if desired without affecting the operating characteristics of the machine in an unfavorable manner. This involves the use of a secondary winding so arranged that at the lower pole number the winding links the flux less effectively than at the higher (normal) pole number. The arrangements of two secondary windings suitable for this purpose are illustrated as examples in Fig. 2 and Fig. 3.

Figure 2:
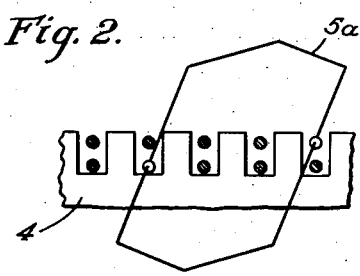
Fig. 2 is a schematic showing of a special type of squirrel cage winding used in the rotor, or inner member, of Fig. 1.
Figure 3:
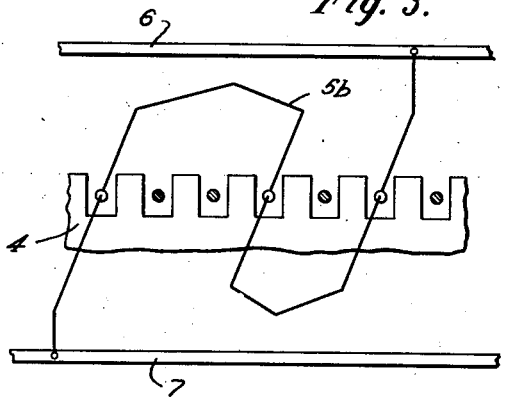
Fig. 3 is a modified form of winding, differing from that of Fig. 2, which can be substituted in the inner rotor member of Fig. 1.

The winding shown in Fig. 2 has two strap-conductors per slot, and comprises a plurality of identically equal short-circuited turns $5a$, each formed by two of said conductors. If the throw of the short-circuited turn is so chosen that at the higher (normal) pole number, $$\frac{\text{coil throw}}{\text{pole pitch}} = 0.8$$

the chord factor $kp$ at this pole number is equal to $\sin(.8 \times 90)°$ or equal to 0.96. If then the pole number is reduced to half, the chord factor drops to sin(.4×90)°, that is to 0.59, but this is equivalent to an increase of the secondary resistance in the ratio $$\left(\frac{0.96}{0.59}\right)^2 = 2.65.$$

The winding illustrated in Fig. 2 does not need any end-rings.

The winding 5b shown in Fig. 3, however, must be equipped with two end-rings 6 and 7. However, if the two component throws of a winding as shown in Fig. 3 are properly chosen, this winding will be more effective (in the sense outlined above) than a winding as shown in Fig. 2.

While I have shown two types of windings, namely, that of Fig. 2 and of Fig. 3 to illustrate the principles of my invention, it will be apparent that other windings may be devised and arranged so that at the lower pole number the flux is linked less effectively than at the higher pole number, in which the effective secondary resistance is increased substantially by a reduction in the number of poles. The characteristic distinction of my squirrel-cage type of winding from ordinary squirrel-cage windings is that in such squirrel-cage type of winding the adjacent bars are not electrically interconnected and the bars have a definite coil throw which is entirely lacking in an ordinary squirrel-cage winding. The coil throw may be selected in a range from 50% to 100% of the smaller pole pitch, that is, for the higher number of poles.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A variable transmission ratio electromagnetic coupling comprising, in combination, a rotatable driving member and a rotatable driven member, one of said members comprising a plurality of salient pole windings, a source of direct current for energizing said windings, switching means for selectively and electrically varying the total number of poles, the other of said members comprising a rotor having a squirrel cage type of winding mounted thereon including a pair of end-rings, and including a plurality of individual wave-like windings, each comprising a plurality of conductor bars in separate slots serially connected between said end-rings, said conductor bars being unequally spaced from each other.

2. A variable transmission ratio electromagnetic coupling comprising, in combination, a rotatable driving member and a rotatable driven member, one of said members comprising a plurality of salient pole windings, a source of direct current for energizing said windings, switching means for selectively and electrically varying the total number of poles, the other of said members comprising a rotor having a squirrel cage type of winding mounted thereon including a pair of end rings between which are connected the extremities of a plurality of individual wave-like windings each having at least three serially connected conductor bars in separate slots forming two component throws of each winding, the throw of one component being approximately twice the throw of the other component.

3. A variable transmission ratio electromagnetic coupling comprising, in combination, a rotatable driving member and a rotatable driven member, one of said members comprising a plurality of salient pole windings, a source of direct current, for energizing said windings, switching means for selectively and electrically varying the total number of poles, the other of said members comprising a rotor having a squirrel cage type of winding mounted thereon including a pair of end rings and a plurality of individual wave-like windings each having a pair of end-conductor bars and an intermediate conductor bar serially connected between said end rings, the intermediate conductor bar being spaced at least twice the distance from one of said end conductor bars than it is spaced from the other of said end conductor bars.

MICHAEL LIWSCHITZ.